(12) United States Patent
Hollen et al.

(10) Patent No.: US 11,952,113 B1
(45) Date of Patent: Apr. 9, 2024

(54) WING LOCK AND DEPLOYMENT MECHANISM

(71) Applicant: The Boeing Company, Chicago, IL (US)

(72) Inventors: Keith Ryan Hollen, Saint Charles, MO (US); Nathan Adam Kostelecky, Wentzville, MO (US); Bryan Michael Loris, Saint Charles, MO (US); Jonathan David Gettinger, Imperial, MO (US); Alexander McGregor, St. Louis, MO (US); Everett Ryan Eaton, Saint Charles, MO (US); Michael L. Oleshchuk, Saint Charles, MO (US)

(73) Assignee: The Boeing Company, Chicago, IL (US)

( * ) Notice: Subject to any disclaimer, the term of this patent is extended or adjusted under 35 U.S.C. 154(b) by 57 days.

(21) Appl. No.: 17/936,091

(22) Filed: Sep. 28, 2022

(51) Int. Cl.
*B64C 3/56* (2006.01)
*B64D 5/00* (2006.01)

(52) U.S. Cl.
CPC . *B64C 3/56* (2013.01); *B64D 5/00* (2013.01)

(58) Field of Classification Search
CPC ........... B64C 3/56; B64C 11/28; B64C 27/50; B64D 5/00
See application file for complete search history.

(56) References Cited

U.S. PATENT DOCUMENTS

| | | | |
|---|---|---|---|
| 7,841,559 B1 | 11/2010 | O'Shea | |
| 10,317,179 B2 | 6/2019 | Lutzenberger | |
| 10,429,158 B2 | 10/2019 | Lutzenberger | |
| 11,255,648 B2 | 2/2022 | O'Shea et al. | |
| 2018/0222569 A1* | 8/2018 | Brakes | B64C 3/56 |
| 2019/0061911 A1* | 2/2019 | Brakes | B64C 3/56 |
| 2020/0307762 A1* | 10/2020 | Morrell | B64C 3/56 |
| 2020/0393223 A1* | 12/2020 | Travis | F42B 10/14 |

* cited by examiner

*Primary Examiner* — Rodney A Bonnette
(74) *Attorney, Agent, or Firm* — Yee & Associates, P.C.

(57) ABSTRACT

A wing lock and deployment apparatus for an air launched vehicle includes a ball screw and driver acted on by a single actuation event. The disclosed wing lock and deployment apparatus is capable of unlocking deployable wings of an air launched vehicle, deploying deployable wings of the air launched vehicle from a stored position, and locking deployable wings of the air launched vehicle in a deployed position in sequential order with the one single actuation event.

20 Claims, 9 Drawing Sheets

WING LOCK AND DEPLOYMENT MECHANISM

BACKGROUND INFORMATION

1. Field

The present disclosure relates generally to air launched vehicles. More specifically, the present disclosure relates to a wing lock and deployment system for storing, unlocking, and deploying wings of an air launched vehicle.

2. Background

Air launched vehicles typically are carried on a host aircraft with deployable wings locked in a stowed position. To maintain safety of flight certifications, the deployable wings must not be unlocked and deployed until the air launched vehicle has separated from the host aircraft. Typically, a locking mechanism that ensures the deployable wings stay locked in the stowed position is independent of a wing deployment mechanism which is also independent of a locking mechanism for the deployable wings once they reach a deployed position. Further, the three separated mechanisms each require a separate command signal which must be accurately timed.

The requirement for three separate mechanisms with their own actuators and mechanism inputs complicates the manufacture and use of air launched vehicles. Many existing solutions require multiple systems to tackle each problem individually. These solutions are complicated and expensive.

Therefore, it would be desirable to have an apparatus and system that takes into account at least some of the issues discussed above, as well as other possible issues.

SUMMARY

An illustrative embodiment of the present disclosure provides a wing lock and deployment apparatus comprising a driver threadably engaged with a ball screw, a deployable wing, and a lock keeper. The driver is configured to move along the ball screw, driven by a motion source. The lock keeper is biased to a position where the lock keeper engages a toggle lock. The bias on the lock keeper positions the lock keeper such that the toggle lock engages the deployable wing to maintain the deployable wing locked in a stored position.

Another illustrative embodiment of the present disclosure provides a wing lock and deployment system for storing, unlocking, and deploying wings of an air launched vehicle comprising a glide kit attached to the air launched vehicle where the glide kit has a stored position and a deployed position. The glide kit includes a housing, deployable wings, a driver threadably engaged with a ball screw, and a lock keeper. The driver is configured to move along the ball screw as the ball screw rotates. The lock keeper is biased to a position where the lock keeper engages a toggle lock. The bias on the lock keeper urges the lock keeper in a first direction and such that the toggle lock engages the deployable wings to maintain the deployable wings locked in a stored position.

A further illustrative embodiment of the present disclosure provides a method for unlocking and deploying wings of an air launched vehicle. The method includes a step of providing a wing lock and deployment apparatus attached to an air launched vehicle. The wing lock and deployment apparatus includes deployable wings and a driver threadably engaged with a ball screw wherein the driver is connected to the deployable wings. The method includes a step of receiving a single command to initiate rotational movement of the ball screw. As a result of the rotational movement of the ball screw, the method includes a step of sequentially unlocking the deployable wings, deploying the deployable wings from a stored position, and locking the deployable wings in a deployed position.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account a typical wing lock and deployment system for an air launched vehicle requires three separate mechanisms and three separate commands from a control system for unlocking deployable wings from a locked condition, deploying the wings from a stored position to a deployed position, and relocking the wings in the deployed position.

The illustrative embodiments recognize and take into account that requiring three separate mechanisms and three separate command signals to unlock, deploy, and relock deployable wings of an air launched vehicle is overly complicated, costly, and requires specific timing of the three separate commands.

Thus, the illustrated embodiments provide a wing lock and deployment apparatus that allows for a single command to unlock deployable wings of an air launched vehicle, deploy the wings to a deployed position, and relock the wings in the deployed position. The illustrated embodiments eliminate the needs for three separate mechanisms with their own actuators and mechanism inputs and instead accomplish all three tasks with one single linear actuation event.

The illustrated embodiments provide a wing lock and deployment apparatus and system which only receives one input and accomplishes all three tasks in order, reliably and inexpensively.

Figure 1:
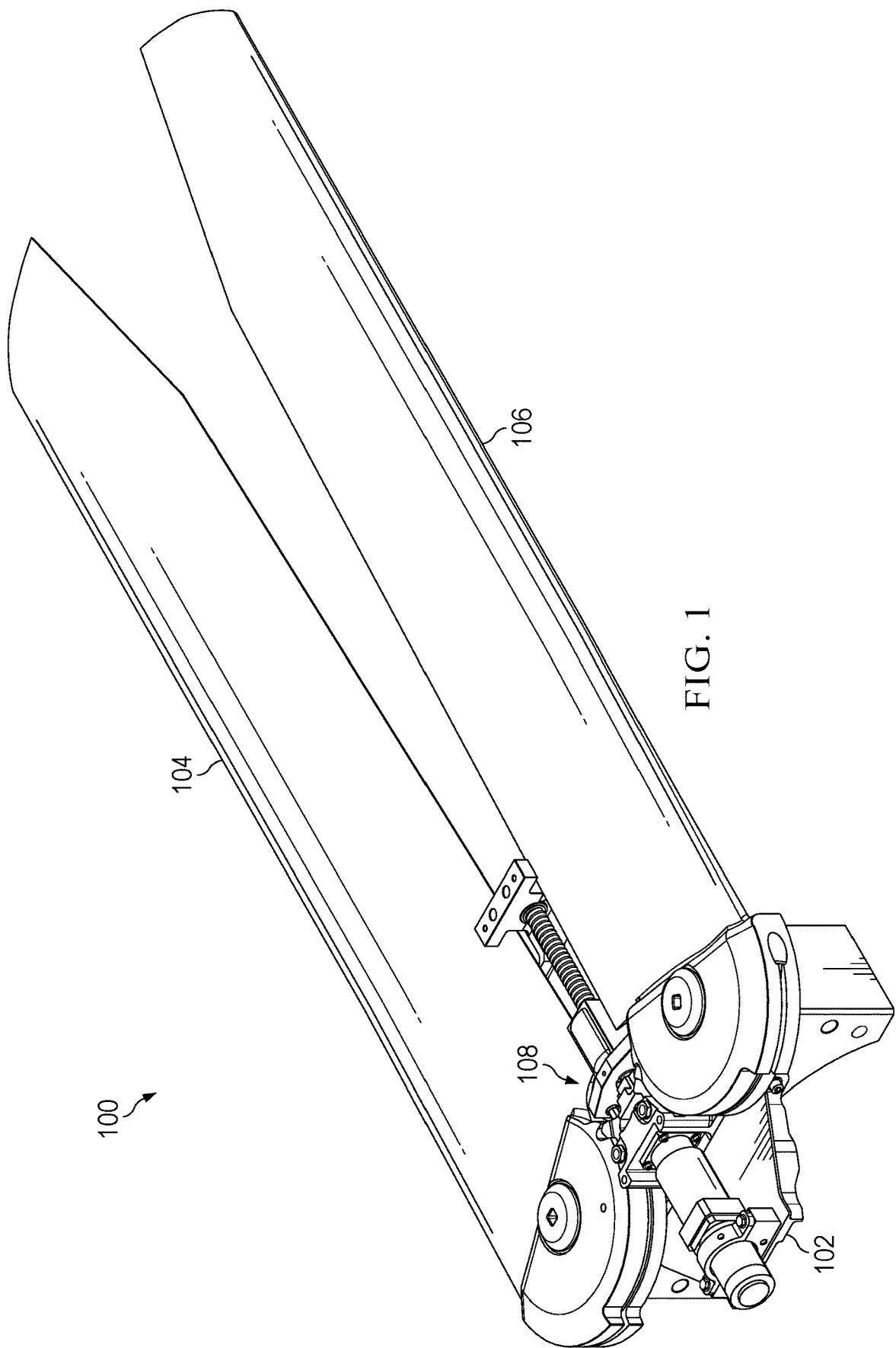
FIG. 1 is an illustration of a glide kit of an air launched vehicle in a stored position in accordance with an illustrative example.
Figure 2:
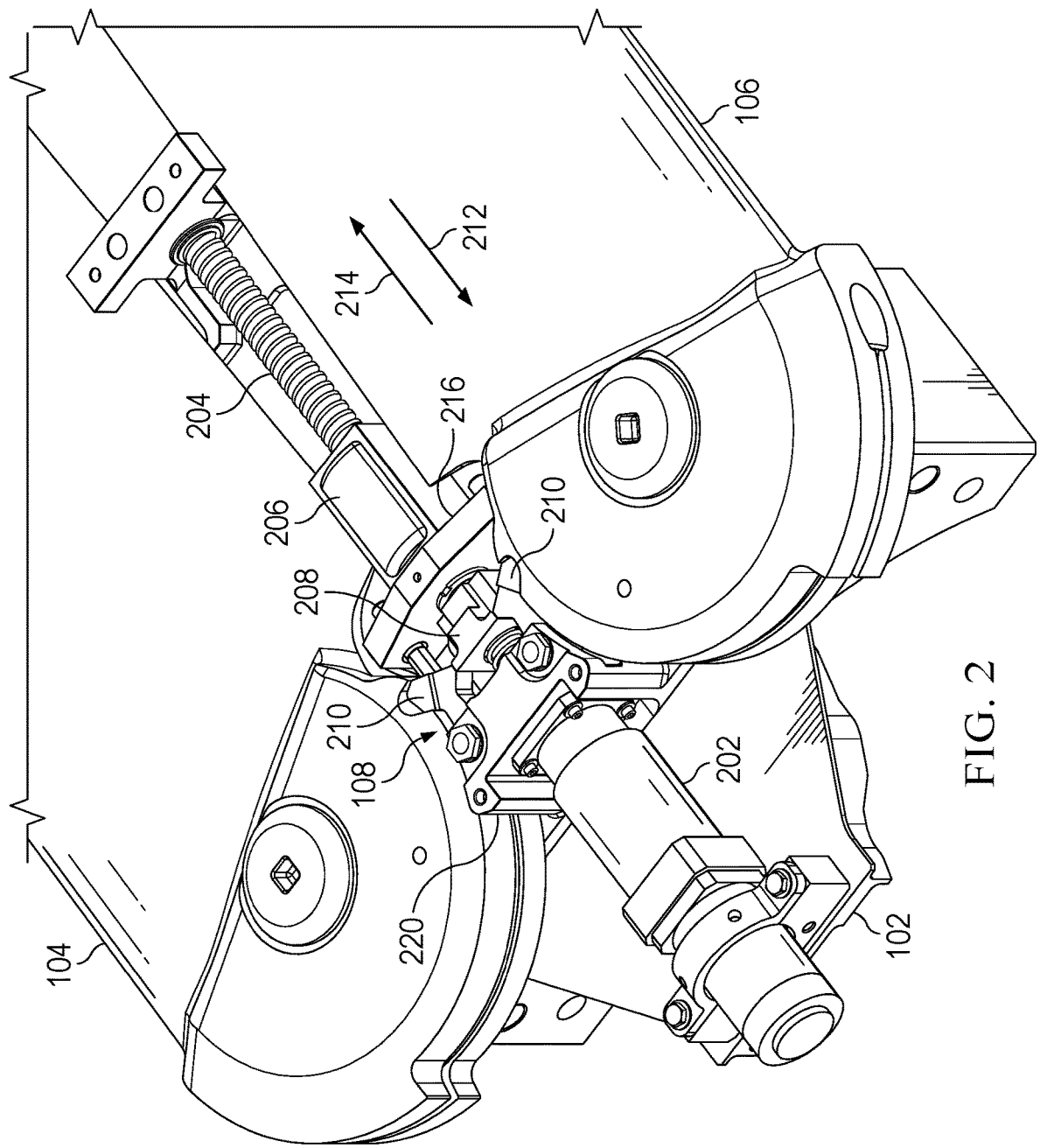
FIG. 2 is an illustration of a wing lock and deployment apparatus of an air launched vehicle in a stored position in accordance with an illustrative example.

With reference now to the figures and, in particular, with reference to FIG. 1, an illustration of a glide kit of an air launched vehicle is depicted in accordance with an illustrative embodiment. Glide kit 100 has housing 102, deployable wing 104 and deployable wing 106, and wing lock and deployment apparatus 108. Housing 102 acts a base or platform for mounting the components of glide kit 100 thereon. Housing 102 also provides an attachment point of glide kit 100 to structure of an air launched vehicle. The air launched vehicle, complete with attached glide kit 100, may be carried or transported by a host aircraft (not shown) until deployed from the host aircraft.

Figure 3:
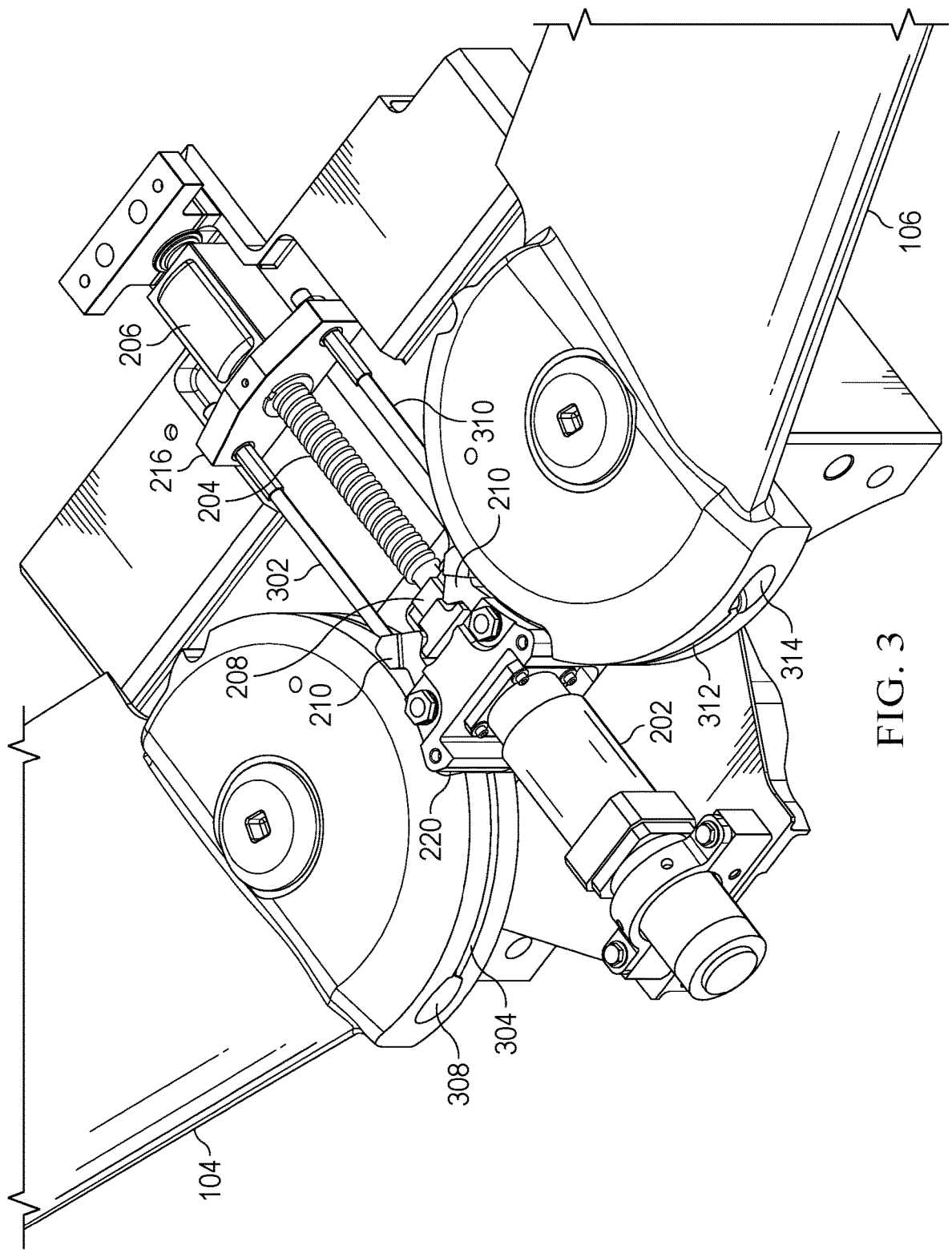
FIG. 3 is an illustration of a glide kit of an air launched vehicle in a deployed position in accordance with an illustrative example.
Figure 4:
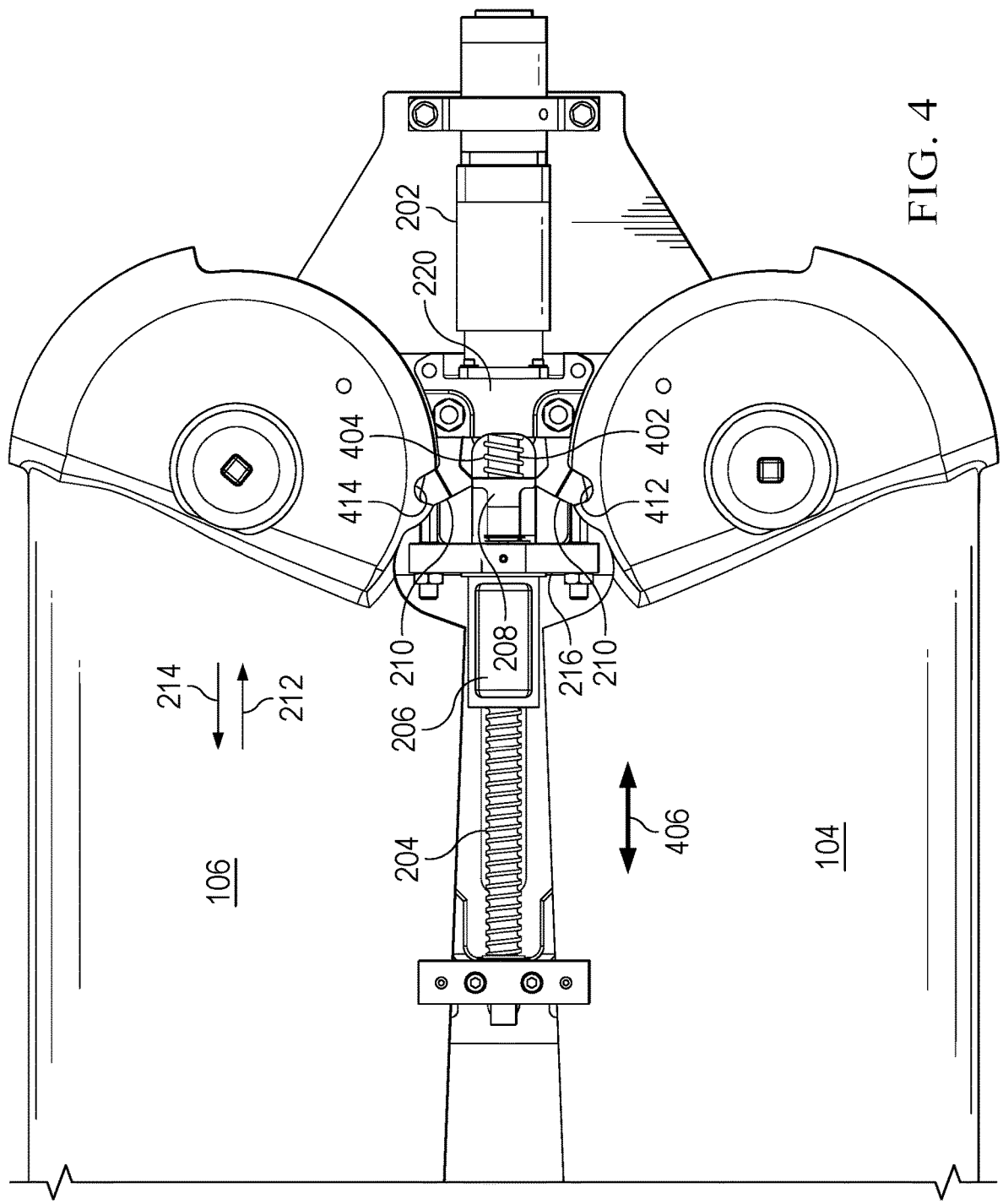
FIG. 4 is an illustration of a wing lock and deployment apparatus of an air launched vehicle in a stored position from the top in accordance with an illustrative example.
Figure 5:
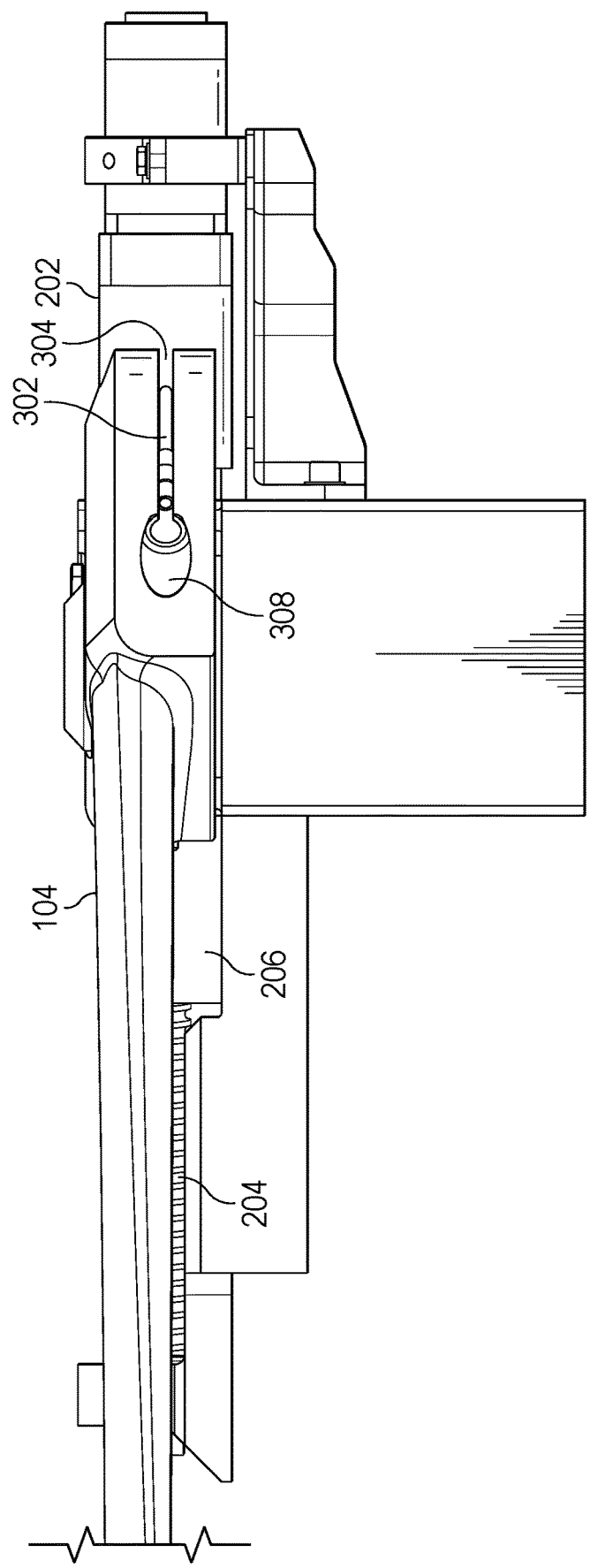
FIG. 5 is an illustration of a wing lock and deployment apparatus of an air launched vehicle in a stored position from the side in accordance with an illustrative example.

Deployable wing 104 is pivotally mounted on housing 102. Deployable wing 106 is pivotally mounted on housing 102. Deployable wing 104 and deployable wing 106 are illustrated in a stored position in FIG. 1. Deployable wing 104 and deployable wing 106 may pivot with respect to housing 102 from the stored position (FIG. 1) to a deployed position (FIG. 3). Wing lock and deployment apparatus 108 is mounted to housing 102. In the stored position, while the air launched vehicle is transported by the host aircraft, wing lock and deployment apparatus 108 securely locks deployable wing 104 and deployable wing 106 in the stored position. To maintain safety of flight certifications, the deployable wings must not be unlocked and deployed until the air launched vehicle has separated from the host aircraft.

After launching the air launched vehicle with glide kit 100 attached from the host aircraft, a single command received by wing lock and deployment apparatus 108 initiates a single actuation event which causes wing lock and deployment apparatus 108 to sequentially unlock deployable wing 104 and unlock deployable wing 106 from the stored position, deploy deployable wing 104 and deployable wing 106, and lock the deployable wings in the deployed position. Wing lock and deployment apparatus 108 accomplishes the three operations of unlocking, deploying, and locking the deployable wings in a sequential manner with a single command. In other words, deploying the wings occurs after the wings are unlocked and locking the wings in the deployed position occurs after the wings are deployed. A single command received by wing lock and deployment apparatus 108 initiates the three sequentially ordered operations. Wing lock and deployment apparatus 108 is capable of accomplishing the three sequentially ordered operations upon receiving a single command.

With reference next to FIGS. 2-5, illustrations of a wing lock and deployment apparatus of a glide kit for an air launched vehicle are depicted in accordance with illustrative examples.

In these illustrated examples, wing lock and deployment apparatus 108 has motor 202, ball screw 204, driver 206, lock keeper 208, and toggle lock 210.

Motor 202 is mounted to housing 102. As depicted, driver 206 is threadably engaged with ball screw 204 and ball screw 204 is mechanically engaged with motor 202. Motor 202 provides rotational movement which wing lock and deployment apparatus 108 passes to ball screw 204 and converts to linear movement applied to driver 206. As depicted, motor 202 rotates ball screw 204 and driver 206 acts as a ball nut. When driver 206 is restrained (described further below), the rotational movement of ball screw 204 provides linear movement of ball screw 204 in direction 212. When driver 206 is no longer restrained, rotational movement of ball screw 204 provides linear movement of driver 206 in direction 214 along ball screw 204. As a result, ball screw 204 has a resting state before rotational movement is imparted to ball screw 204 and a moving state as rotational movement is imparted to ball screw 204. In the moving state, ball screw 204 not only rotates about its longitudinal axis but can also translate (in direction 212) along its longitudinal axis. Ball screw 204 is not limited to the structure of ball screw 204 as depicted. Those skilled in the art recognize that the function provided by ball screw 204 may be accomplished by other means including, but not limited to, for example, other threaded interfaces.

Fitting 216 is connected to driver 206. Cable 302 is connected to fitting 216. Cable 302 is connected to deployable wing 104. Cable 302 is seated in groove 304 formed in the base of deployable wing 104. Essentially, cable 302 wraps around the base of deployable wing 104 in groove 304. An end of cable 302 is retained in notch 308 formed at an end of groove 304. In like fashion, cable 310 is connected to fitting 216. Cable 310 is connected to deployable wing 106. Cable 310 is seated in groove 312 formed in the base of deployable wing 106. Cable 310 wraps around the base of deployable wing 106 in groove 312. An end of cable 310 is retained in notch 314 formed at an end of groove 312.

Wing fitting 220 is connected to housing 102. Wing fitting 220 may be unitarily or integrally formed with housing 102. Wing fitting 220 houses torque coupling 402. Torque coupling 402 is mechanically connected to motor 202 and to ball screw 204. Rotational movement provided by motor 202 is translated to ball screw 204 via torque coupling 402.

Spring 404 surrounds torque coupling 402. Spring 404 abuts wing fitting 220 in a counterbore formed in wing fitting 220. Spring 404 abuts lock keeper 208. Spring 404 provides bias 406. As depicted, spring 404 is a coil spring that surrounds torque coupling 402. Spring 404 abuts wing fitting 220 and abuts lock keeper 208 such that bias 406 urges lock keeper 208 in direction 214. The urged movement of lock keeper 208 provided by bias 406 is not limited to a coil spring setup depicted. Those skilled in the art recognize that bias may be imparted to lock keeper 208 by other means including, but not limited to, for example, a biased slider joint.

In the stored position, as depicted in FIGS. 2 and 4-7, ball screw 204 is in the resting state. Bias 406 urges lock keeper 208 in direction 214 until lock keeper 208 abuts shoulder 606 (FIG. 6) of ball screw 204. When ball screw 204 is in the resting state and lock keeper is urged by bias 406 in direction 214, lock keeper 208 moves toggle lock 210 into engagement with both deployable wing 104 and deployable wing 106. Toggle lock 210 engages notch 412 formed in deployable wing 104 and toggle lock 210 engages notch 414 formed in deployable wing 106. When toggle lock 210 engages notch 412 and notch 414, the deployable wings are locked in the stored position. Bias 406 on lock keeper 208 maintains lock keeper 208 in a position that forces toggle lock 210 into notch 412 and notch 414 thus locking the deployable wings in the stored position.

Figure 6:
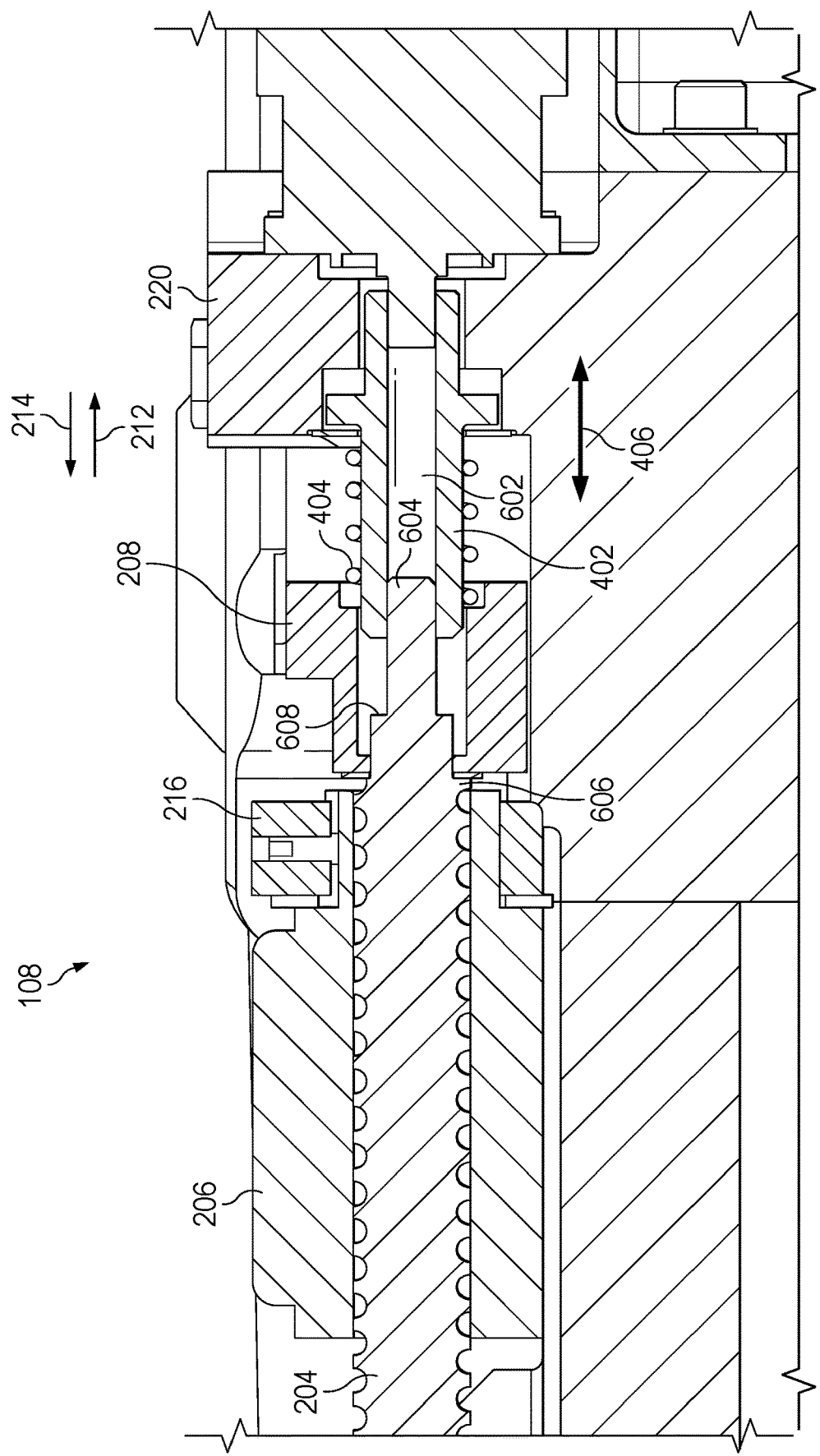
FIG. 6 is an illustration of a cross-sectional view of a wing lock and deployment apparatus of an air launched vehicle in a stored position in accordance with an illustrative example.

With reference to FIG. 6, an illustration of a cross-sectional view of wing lock and deployment apparatus 108 in the stored position is depicted in accordance with an illustrative example. Torque coupling 402 includes channel 602. Channel 602 is sized and shaped to receive tongue 604 of ball screw 204. The engagement between tongue 604 and channel 602 imparts rotational movement of torque coupling 402 to ball screw 204. The engagement between tongue 604 and channel 602 allows for translational movement of ball screw 204 relative to torque coupling 402. Shoulder 608 of ball screw 204 provides a stop for translational movement of ball screw 204 relative to torque coupling 402 in direction 212.

As previously described, when ball screw 204 is in the resting state, the deployable wings are locked in the stored position. Upon receiving a single command to unlock and deploy the deployable wings, wing lock and deployment apparatus 108 imparts rotational movement to ball screw 204. As rotational movement is applied to ball screw 204, ball screw 204 is in the moving state. As is known in the art, in a typical ball screw/ball nut set up, rotation of the ball screw tends to impart linear movement on the ball nut along the ball screw. In the present application, however, since driver 206 (acting as a ball nut) is connected to the deployable wings by cable 302 and cable 310 and since the deployable wings are locked in the stored position by toggle lock 210 engaging notch 412 and notch 414, the result is that driver 206 is restrained from moving in direction 214 relative to housing 102 upon rotational movement of ball screw 204. As a result of driver 206 being restrained from movement, rotational movement of ball screw 204 causes ball screw 204 to translate in direction 212. Ball screw 204 is connected to torque coupling 402.

Channel 602 in torque coupling 402 allows translational movement of ball screw 204 relative to torque coupling 402 in direction 212. As ball screw 204 translates in direction 212, shoulder 606 of ball screw 204 abuts lock keeper 208 and moves lock keeper 208 in direction 212 against bias 406. As lock keeper 208 moves in direction 212 against bias 406, toggle lock 210 disengages from notch 412 in deployable wing 104 and toggle lock 210 disengages from notch 414 in deployable wing 106. After toggle lock 210 disengages from notch 412 and toggle lock 210 disengages from notch 414, deployable wing 104 and deployable wing 106 are free to rotate. Once the deployable wings are free to rotate, driver 206 is no longer restrained. When driver 206 is no longer restrained, driver 206 translates along ball screw 204 in direction 214. As driver 206 translates along ball screw 204 in direction 214, driver 206 pulls on cables 302 and 310 to impart rotational movement of deployable wing 104 and deployable wing 106, respectively. Deployable wing 104 and deployable wing 106 rotate until they are in the deployed position (FIG. 3).

Figure 7:
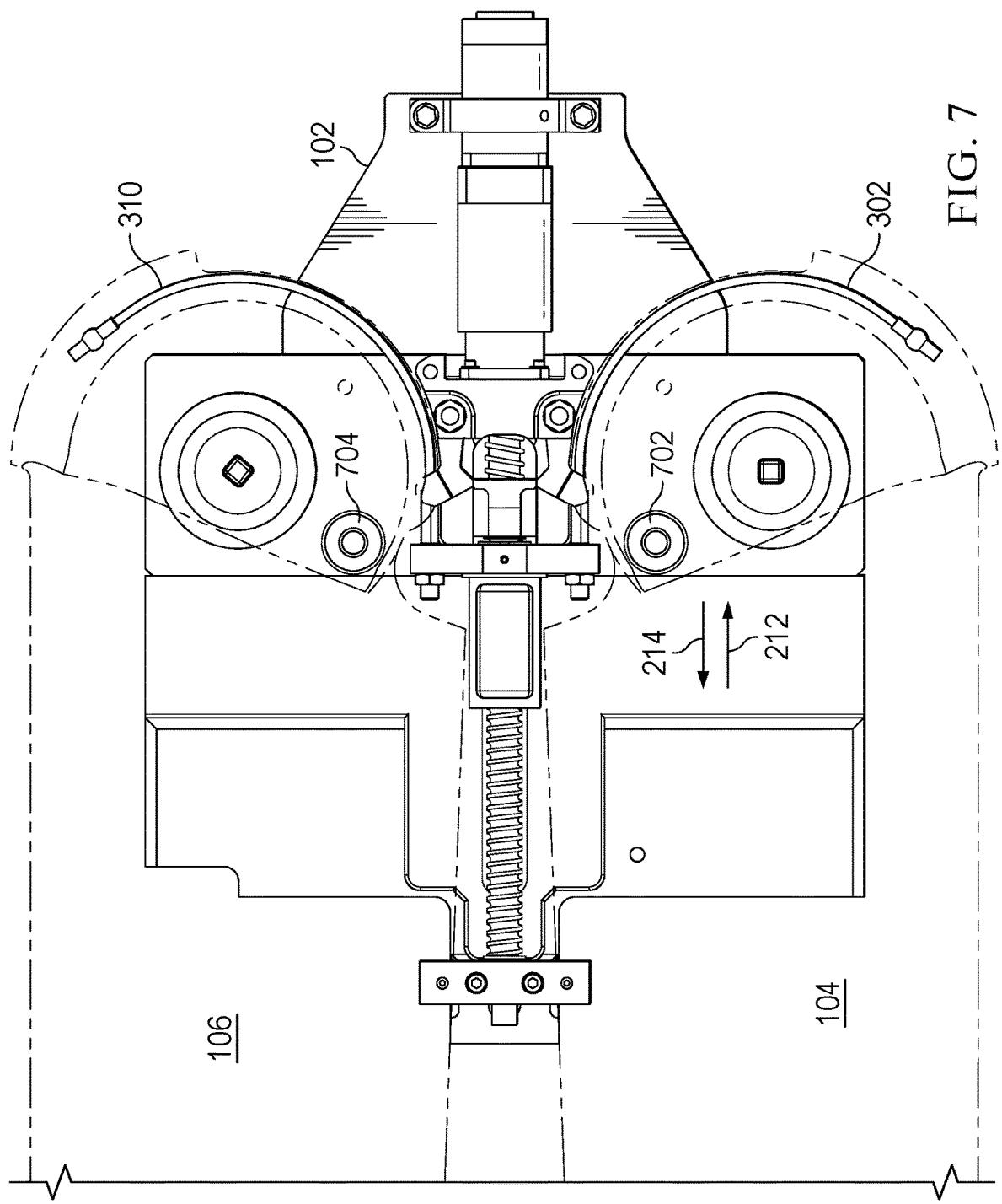
FIG. 7 is an illustration of a wing lock and deployment apparatus of an air launched vehicle in a stored position from the top with the deployable wings in shadow in accordance with an illustrative example.

With reference to FIG. 7, an illustration of wing lock and deployment apparatus 108 in a stored position from the top with the deployable wings in shadow is depicted in accordance with an illustrative example. Lock pin 702 is arranged in housing 102. Lock pin 702 is collapsible within and extendable from housing 102. Lock pin 704 is arranged in housing 102. Lock pin 704 is collapsible within and extendable from housing 102. When in the stored position, lock pin 702 is collapsed within housing 102 and lock pin 704 is collapsed within housing 102. In the deployed position, lock pin 702 extends from housing 102 and engages a pocket in deployable wing 104 to lock deployable wing 104 in the deployed position. In the deployed position, lock pin 704 extends from housing 102 and engages a pocket in deployable wing 106 to lock deployable wing 106 in the deployed position.

Figure 8:
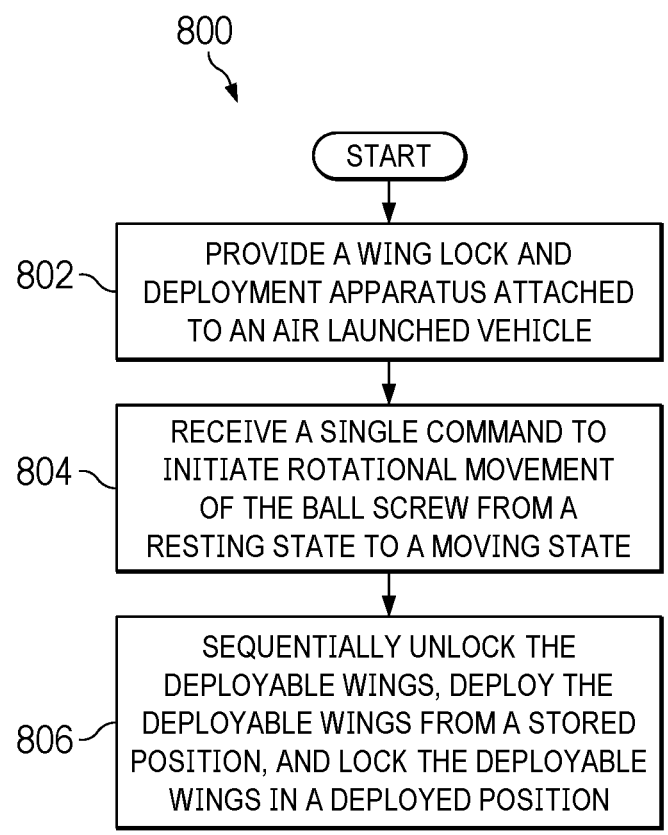
FIG. 8 is an illustration of a flowchart of a process for unlocking and deploying wings of an air launched vehicle in accordance with an illustrative embodiment.

With reference next to FIG. 8, an illustration of a flowchart of a process 800 for unlocking and deploying wings of an air launched vehicle is depicted in accordance with an illustrative embodiment. The method depicted in FIG. 8 may be used in conjunction with the wing lock and deployment apparatus depicted in FIGS. 1-7.

The process begins by providing a wing lock and deployment apparatus for attachment to an air launched vehicle (operation 802). The wing lock and deployment apparatus may include features and structure as depicted in FIGS. 1-7. The process receives a single command to initiate rotational movement of a ball screw of the wing lock and deployment apparatus from a resting state to a moving state (operation 804). When the ball screw is in the resting state, a bias on a lock keeper forces a toggle lock into engagement with deployable wings to put the wing lock and deployment apparatus in a locked position. When the ball screw is in the moving state, the driver is restrained until translational movement of the ball screw in a first direction imparts translational movement of the lock keeper in the first direction to overcome the bias and to disengage the toggle lock from engagement with deployable wings to unlock the deployable wings. Once the deployable wings are unlocked, the driver is no longer restrained. The unrestrained driver moves in a second direction along the ball screw and pulls on the deployable wings via connected cables to force rotation of the deployable wings from a stored position to a deployed position. At operation 806, as a result of the rotational movement of the ball screw, the process sequentially unlocks the deployable wings from a stored position, deploys the deployable wings from the stored position, and locks the deployable wings in a deployed position.

In some alternative implementations of an illustrative example, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 9:
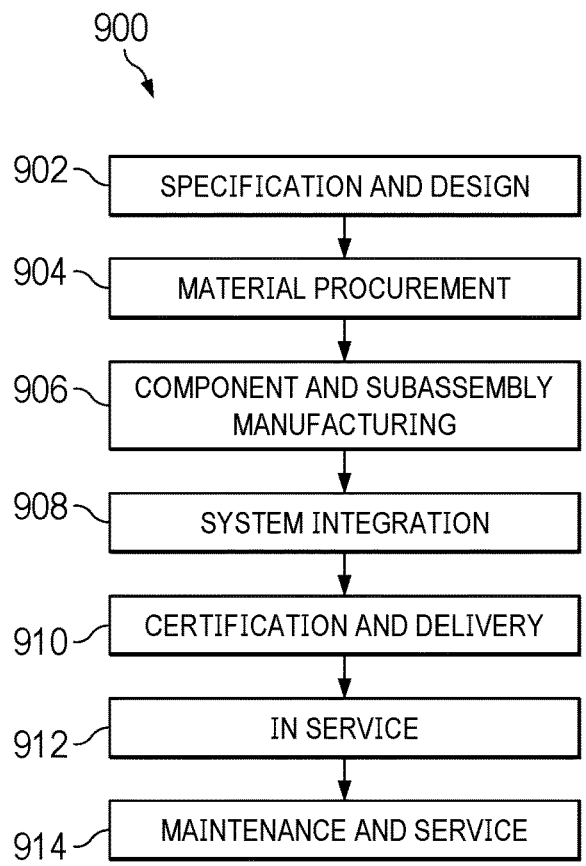
FIG. 9 is an illustration of a block diagram of an aircraft manufacturing and service method in accordance with an illustrative embodiment.
Figure 10:
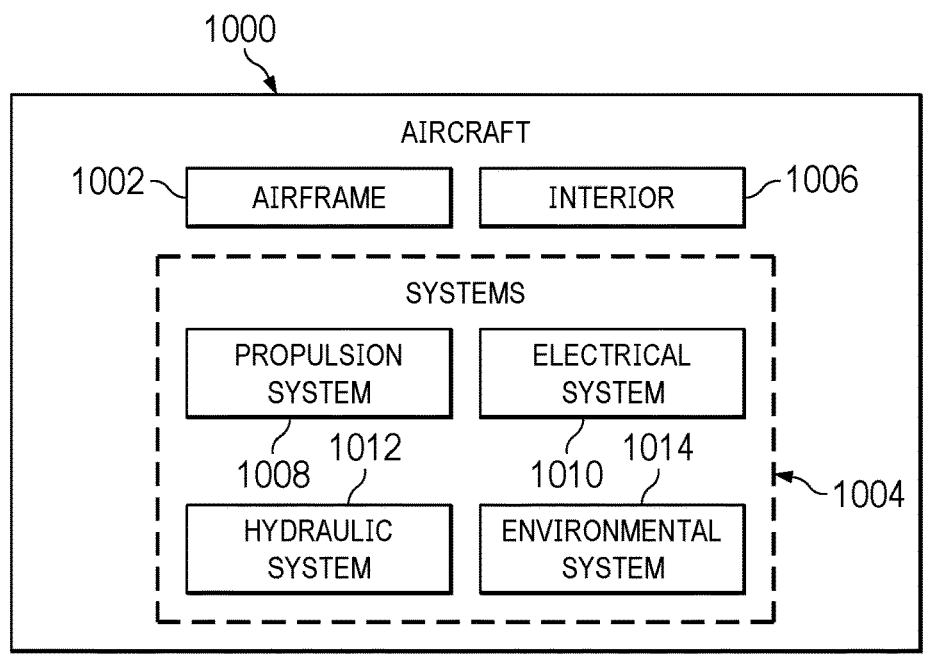
FIG. 10 is an illustration of a block diagram of an aircraft in which an illustrative embodiment may be implemented.

The illustrative embodiments of the disclosure may be further described in the context of aircraft manufacturing and service method 900 as shown in FIG. 9 and aircraft 1000 as shown in FIG. 10. Turning first to FIG. 9, an illustration of a block diagram of an aircraft manufacturing and service method is depicted in accordance with an illustrative embodiment. During pre-production, aircraft manufacturing and service method 900 may include specification and design 902 of aircraft 1000 in FIG. 10 and material procurement 904. Aircraft 1000 in FIG. 10 may be an air launched vehicle or a host aircraft as previously described.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of a block diagram of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9. In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

The illustrative examples eliminate the need for three separate mechanisms with their own actuators and mechanism inputs and instead accomplishes all three tasks of unlocking deployable wings of an air launched vehicle, deploying deployable wings of an air launched vehicle from a stored position, and locking deployable wings of an air launched vehicle in a deployed position with one single actuation event.

The single command received by the disclosed wing lock and deployment apparatus causes the single actuation event which accomplishes all three tasks in sequential order.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A wing lock and deployment apparatus, comprising:
   a driver threadably engaged with a ball screw;
   a deployable wing connected to the driver;
   a lock keeper engaged with a toggle lock, the toggle lock releasably engaged with the deployable wing; and
   a bias on the lock keeper, the bias configured to urge the lock keeper in a first direction and force the toggle lock into engagement with the deployable wing.

2. The apparatus of claim 1 further comprising a fitting attached to the driver, wherein a cable is attached to the fitting and wherein the cable is seated in a groove around a base of the deployable wing and attached to the deployable wing.

3. The apparatus of claim 1 further comprising:
   a housing, the deployable wing pivotably attached to the housing;
   a wing fitting connected to the housing; and
   a torque coupling extending from the wing fitting and longitudinally movable within the wing fitting, the torque coupling connected to the ball screw.

4. The apparatus of claim 3, wherein the bias is a spring surrounding the torque coupling, the spring in contact with the wing fitting and the lock keeper.

5. The apparatus of claim 3 further comprising a lock pin collapsible within and extendable from the housing, the lock pin sized to engage a pocket in the deployable wing.

6. The apparatus of claim 5, wherein the lock pin extends from the housing and engages the pocket when the deployable wing is in a deployed position.

7. The apparatus of claim 1, wherein the ball screw has a resting state and a moving state, wherein when the ball screw is in the resting state the toggle lock is engaged with the deployable wing.

8. The apparatus of claim 7, wherein when the ball screw is in the moving state, the ball screw abuts the lock keeper and forces the lock keeper to move against the bias in a second direction, the second direction opposite the first direction.

9. The apparatus of claim 7, wherein when the ball screw is in the moving state, the toggle lock is disengaged from the deployable wing and subsequently the driver moves along the ball screw in the first direction.

10. A wing lock and deployment system for storing, unlocking, and deploying wings of an air launched vehicle, comprising:
   a glide kit attached to the air launched vehicle, the glide kit comprising a stored position and a deployed position;
   the glide kit comprising:
      a housing;
      a first deployable wing pivotably attached to the housing and a second deployable wing pivotably attached to the housing;
      a driver threadably engaged with a ball screw;
      a lock keeper engaged with a toggle lock, the toggle lock releasably engaged with the first deployable wing and the second deployable wing; and
      a bias on the lock keeper, the bias configured to urge the lock keeper in a first direction and force the toggle lock into engagement with the first deployable wing and the second deployable wing.

11. The wing lock and deployment system of claim 10 further comprising a fitting attached to the driver, wherein a first cable is attached to the fitting and is seated in a groove around a base of the first deployable wing, and wherein a second cable is attached to the fitting and is seated in a groove around a base of the second deployable wing.

12. The wing lock and deployment system of claim 10 further comprising:
   a wing fitting connected to the housing; and
   a torque coupling extending from the wing fitting and longitudinally movable with respect to the wing fitting, the torque coupling connected to the ball screw.

13. The wing lock and deployment system of claim 12, wherein the bias is a spring surrounding the torque coupling, the spring in contact with the wing fitting and the lock keeper.

14. The wing lock and deployment system of claim 10, wherein the ball screw has a resting state and a moving state, wherein when the ball screw is in the resting state the toggle lock is engaged with the first deployable wing and the second deployable wing.

15. The wing lock and deployment system of claim 14, wherein when the ball screw is in the moving state, the ball screw abuts the lock keeper and forces the lock keeper to move against the bias in a second direction, the second direction opposite the first direction.

16. A method for unlocking and deploying wings of an air launched vehicle, the method comprising:
   providing a wing lock and deployment apparatus attached to an air launched vehicle, wherein the wing lock and deployment apparatus comprises:
      deployable wings; and
      a driver threadably engaged with a ball screw and connected to the deployable wings;
   receiving a single command to initiate rotational movement of the ball screw from a resting state to a moving state; and
   as a result of the rotational movement of the ball screw, sequentially unlocking the deployable wings and deploying the deployable wings from a stored position.

17. The method of claim 16, wherein the wing lock and deployment apparatus further comprises a lock keeper engaged with a toggle lock and wherein when the ball screw is in the resting state, a bias on the lock keeper moves the lock keeper in a first direction and forces the toggle lock into engagement with the deployable wings to lock the deployable wings in the stored position.

18. The method of claim 17, wherein when the ball screw is in the moving state, the ball screw abuts the lock keeper and forces the lock keeper to move against the bias in a second direction, the second direction opposite the first direction.

19. The method of claim 18, wherein when the lock keeper moves against the bias in the second direction, the toggle lock is disengaged from the deployable wings and subsequently the driver moves along the ball screw in the first direction.

20. The method of claim 19, wherein when the driver subsequently moves along the ball screw in the first direction, a first cable connected to the driver and a first deployable wing of the deployable wings forces the first deployable wing to rotate from the stored position to a deployed position and a second cable connected to the driver and a second deployable wing of the deployable wings forces the second deployable wing to rotate from the stored position to the deployed position.

* * * * *